US008138233B2

(12) United States Patent
Agarwal et al.

(10) Patent No.: US 8,138,233 B2
(45) Date of Patent: *Mar. 20, 2012

(54) PROCESS FOR MAKING POLYBUTYLENE TEREPHTHALATE (PBT) FROM POLYETHYLENE TEREPHTHALATE (PET)

(75) Inventors: Parminder Agarwal, Evansville, IN (US); Kristen Cohoon-Brister, Charlotte, NC (US); Sandeep Dhawan, Newburgh, IN (US); Robert Russell Gallucci, Mt. Vernon, IN (US); Ganesh Kannan, Evansville, IN (US); Kenneth Frederick Miller, Posey, IN (US); Dhaval Shah, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/021,093

(22) Filed: Feb. 4, 2011

(65) Prior Publication Data
US 2011/0124821 A1 May 26, 2011

Related U.S. Application Data

(62) Division of application No. 11/626,684, filed on Jan. 24, 2007, now Pat. No. 7,902,263.

(60) Provisional application No. 60/763,093, filed on Jan. 27, 2006, provisional application No. 60/820,463, filed on Jul. 26, 2006.

(51) Int. Cl.
*C08J 11/04* (2006.01)

(52) U.S. Cl. ............. 521/40; 521/40.5; 521/47; 521/48; 528/271; 528/272; 528/275; 528/308.2; 528/480; 528/481; 528/488; 528/489; 528/495; 528/502 R

(58) Field of Classification Search ............. 521/40, 521/40.5, 41, 42, 42.5, 47, 48, 49.5; 528/271, 528/272, 274, 275, 278, 279, 280, 282, 308.1, 528/308.2, 308.3, 30, 8.5, 480, 481, 488, 528/489, 491, 495, 502 R, 503
See application file for complete search history.

(56) References Cited

U.S. PATENT DOCUMENTS

| 2,465,319 | A | 3/1949 | Whinfield et al. |
| 2,727,881 | A | 2/1955 | Caldwell et al. |
| 2,720,502 | A | 10/1955 | Caldwell |
| 2,822,348 | A | 2/1958 | Haslam |
| 3,047,539 | A | 7/1962 | Pengilly |
| 3,671,487 | A | 6/1972 | Abolins |
| 3,701,755 | A | 10/1972 | Sumoto et al. |
| 3,855,277 | A | 12/1974 | Fox |
| 3,864,428 | A | 2/1975 | Nakamura et al. |
| 3,907,868 | A | 9/1975 | Currie et al. |
| 3,907,926 | A | 9/1975 | Brown et al. |
| 3,909,926 | A | 10/1975 | Hutson |
| 3,953,394 | A | 4/1976 | Fox et al. |
| 3,953,404 | A | 4/1976 | Borman |
| 4,011,285 | A | 3/1977 | Seymour et al. |
| 4,096,156 | A | 6/1978 | Freudenberger et al. |
| 4,128,526 | A | 12/1978 | Borman |
| 4,140,670 | A | 2/1979 | Charles et al. |
| 4,154,775 | A | 5/1979 | Axelrod |
| 4,157,325 | A | 6/1979 | Charles et al. |
| 4,161,498 | A | 7/1979 | Bopp |
| 4,184,997 | A | 1/1980 | Wu |
| 4,203,887 | A | 5/1980 | Goedde et al. |
| 4,264,487 | A | 4/1981 | Fromouth et al. |
| 4,355,155 | A | 10/1982 | Nelson |
| 4,469,851 | A | 9/1984 | Charles et al. |
| 4,579,884 | A | 4/1986 | Liu |
| 4,598,117 | A | 7/1986 | Liu et al. |
| 4,609,680 | A | 9/1986 | Fujita et al. |
| 5,122,551 | A | 6/1992 | Gallucci et al. |
| 5,266,601 | A | 11/1993 | Kyber et al. |
| 5,326,806 | A | 7/1994 | Yokoshima et al. |
| 5,413,681 | A | 5/1995 | Tustin et al. |
| 5,451,611 | A | 9/1995 | Chilukuri et al. |
| 5,559,159 | A | 9/1996 | Sublett et al. |
| 5,858,551 | A | 1/1999 | Salsman |

(Continued)

FOREIGN PATENT DOCUMENTS

EP 0127981 12/1984
(Continued)

OTHER PUBLICATIONS

International Search Report; International Application No. PCT/US2007/002197; International Filing Date: Jan. 26, 2007; Date of Mailing: Jun. 19, 2007; 5 pages.
S.H. Mansour et al., "Depolymerization of Poly(ethylene terephthalate) Waste Using 1, 4-Butanediol and Triethylene Glycol," Journal of Elastomers and Plastics; Apr. 2003, pp. 133-147, vol. 35, Sage Publications.
S. Sivaram et al., "Synthesis Characterization and Polycondensation of Bis-(4-Hydroxybutyl) Terephthalate" Polymer Bulletin, 1981, pp. 159-166, vol. 5, Springer-Verlag.
"GE Gives Plastic Bottle Recycling a New Spin"; ChemicalProcessing.com Aug. 25, 2006 [online] accessed via the internet [retrieved on Oct. 16, 2009], URS: <http://www.chemicalprocessing.com/industrynews/2006/056.html>, 2 pages.

(Continued)

*Primary Examiner* — James J Seidleck
*Assistant Examiner* — Frances Tischler
(74) *Attorney, Agent, or Firm* — Cantor Colburn LLP; Diderico van Eyl

(57) ABSTRACT

In one embodiment, the invention relates to a two step process in which a 1,4-butane diol component reacts with a polyethylene terephthalate component under conditions that depolymerize the polyethylene terephthalate component into a molten mixture and the molten mixture is placed under subatmospheric conditions that produce the modified polybutylene terephthalate random copolymers. In another embodiment, the invention relates to a three step process in which a diol component selected from the group consisting of ethylene glycol, propylene glycol, and combinations thereof reacts with a polyethylene terephthalate component under conditions sufficient to depolymerize the polyethylene terephthalate component into a first molten mixture; and where the first molten mixture is combined with 1,4-butane diol under conditions that create a second molten mixture that is subsequently placed under subatmospheric conditions that produce the modified polybutylene terephthalate random copolymers. The invention also relates to compositions made from processes of the invention.

30 Claims, No Drawings

U.S. PATENT DOCUMENTS

| | | | |
|---|---|---|---|
| 5,882,780 A | 3/1999 | Yamamura et al. | |
| 6,162,837 A | 12/2000 | Gerking et al. | |
| 6,255,371 B1 | 7/2001 | Schlosser et al. | |
| 6,410,607 B1 | 6/2002 | Ekart et al. | |
| 6,515,044 B1 | 2/2003 | Idel et al. | |
| 6,518,322 B1 | 2/2003 | West | |
| 6,706,843 B1 | 3/2004 | Ishihara et al. | |
| 6,887,909 B2 | 5/2005 | Kawamura et al. | |
| 7,183,362 B2 | 2/2007 | Hirokane et al. | |
| 7,388,067 B2 | 6/2008 | Leemans et al. | |
| 2002/0012807 A1 | 1/2002 | Kurian et al. | |
| 2002/0177636 A1 | 11/2002 | Kawamura et al. | |
| 2004/0059084 A1 | 3/2004 | Hirokane et al. | |
| 2005/0176914 A1 | 8/2005 | Hirokane et al. | |
| 2005/0209435 A1 | 9/2005 | Hirokane et al. | |
| 2007/0203253 A1 | 8/2007 | Agarwal et al. | |
| 2007/0244242 A1 | 10/2007 | Agarwal et al. | |
| 2007/0275242 A1 | 11/2007 | Gopal et al. | |

FOREIGN PATENT DOCUMENTS

| | | |
|---|---|---|
| EP | 0683201 | 11/1995 |
| EP | 1437377 | 7/2004 |
| GB | 150077 | 2/1978 |
| GB | 2048285 A | 12/1980 |
| JP | 58-141236 A | 8/1983 |
| JP | 2000256472 | 9/2000 |
| JP | 2000256920 | 9/2000 |
| KR | 20010083551 | 1/2001 |
| WO | 9950332 | 7/1999 |
| WO | 03066704 | 8/2003 |
| WO | 2007111774 | 10/2007 |
| WO | 2007111774 A2 | 10/2007 |

OTHER PUBLICATIONS

Pawlak, et al.; "Characterization of Scrap Poly(ethylene Terephthalate)"; European Polymer Journal, 36, p. 1875-1884; (2000).

Swedish Patent Office, PCT International Search Report, International Application No. PCT/US07/074211, Date of Mailing: Mar. 6, 2007.

Swedish Patent Office, PCT Written Opinion of the ISA, International Application No. PCT/US07/074211, Date of Mailing: Mar. 6, 2007.

PCT International Search Report for International Application No. PCT/US2007/002197.

S.H. Mansour et al.,"Depolymerization of Poly(ethylene terephthalate) Waste Using 1, 4-Butanediol and Triethylene Glycol," Journal of Elastomers and Plastics; Apr. 2003, pp. 133-147, vol. 35, Sage Publications.

PROCESS FOR MAKING POLYBUTYLENE TEREPHTHALATE (PBT) FROM POLYETHYLENE TEREPHTHALATE (PET)

CROSS REFERENCE TO RELATED APPLICATIONS

This application claims priority to U.S. Provisional Application Ser. Nos. 60/763,093 filed on Jan. 27, 2006 and 60/820,463 filed on Jul. 26, 2006, and to U.S. Non-provisional Application Ser. No. 11/626,684, both of which are incorporated herein by reference in their entirety.

BACKGROUND OF THE INVENTION

Polyethylene terephthalate (also referred to as "PET") is a polyester of terephthalic acid and ethylene glycol and can be obtained by the polycondensation of dimethyl terephthalate with ethylene glycol, and also terephthalic acid with ethylene glycol. PET exists both as an amorphous (transparent) and as a semi-crystalline (opaque and white) thermoplastic material. Generally, it has useful chemical resistance to mineral oils, solvents and acids but not to bases. Semi-crystalline PET has good strength, ductility, stiffness and hardness. Amorphous PET has better ductility but less stiffness and hardness. PET is used to make bottles for soft drinks and other household, consumer and industrial products.

Unfortunately, despite recycling efforts, billions of pounds of PET are still dumped into landfills annually all over the world. Other PET that is not reused is incinerated. The substantial amount of PET that is disposed into landfills creates significant waste. The incineration of PET wastes significant resources that could be used more effectively.

Thermoplastic molding compositions based on polybutylene terephthalate (also referred to as "PBT") and fillers are used in various applications. Although conventional PBT-filler molding compositions are useful to many customers, conventional PBT-filler molding compositions generally cannot be made from recycle sources of PBT due to the lack of availability of PBT recycle streams. PET, unlike PBT, is made in much larger quantities and is partially recovered from consumer wastes. If PET (scrap) materials could be converted to PBT and converted into useful molding compositions, then there would exist a valuable way to meet the unmet need to effectively use underutilized scrap PET in PBT thermoplastic molding compositions.

U.S. Pat. No. 5,451,611 teaches a process for converting waste poly(ethylene terephthalate) to either poly(ethylene-co-butylene terephthalate) or poly(butylene terephthalate) (PBT) by reaction with 1,4-butane diol. In discussing the prior art, U.S. Pat. No. 5,451,611 indicates that in most of the processes it cites, the undesirable byproduct diethylene glycol is formed which contaminates the final product and has to be removed by purification before the recovered products can be reused again. A principal object of U.S. Pat. No. 5,451,611 was to provide a process for converting poly(ethylene terephthalate) waste directly to another high value polymer without breaking down the poly(ethylene terephthalate) to its constituent monomers or oligomers. The patent discloses numerous examples in which a variety of polymers have a diol incorporated at various amounts. Example 11 shows a PBT polymer being formed with a complete replacement of ethylene glycol with 1,4-butane diol.

U.S. Pat. No. 5,266,601 teaches a process for making "PBT" from PET by reacting PET with 1,4-butane diol. A principal object of U.S. Pat. No. 5,266,601 was to produce PBT containing less than 1.0 wt. % units of ethylene glycol from PET scrap. Another principal objective of U.S. Pat. No. 5,266,601 was to develop a process that facilitates the reduction of THF generated in the process as much as possible to the extent that this PBT is economically competitive with PBT obtained from monomers. U.S. Pat. No. 5,266,601 emphasizes the production of PBT having ethylene glycol groups in an amount that is less than 1 wt. %. U.S. Pat. No. 5,266,601 discloses that "[a]ny diethylene glycol units in the starting PET are also eliminated as completely as possible" (Col. 3, 11. 37-38). The patent discloses "adding only enough 1,4-BD [1,4-butane diol] to the PET as is necessary to yield a mixture that can be processed well at the reaction temperature." The patent discloses that, depending on the PET used "up to 1.0 mol 1,4-BD per mol PET" can be used. In the instances where compositions contain more than 1 wt. % ethylene glycol, U.S. Pat. No. 5,266,601 presents these compositions in comparative examples. Such compositions are described as having "yellowish" and "slightly yellowish" colors, respectively. It is not clear what standard is used in U.S. Pat. No. 5,266,601 to determine the weight percent reported, as the weight percent can reasonably be defined in as follows: (i) a divalent ethylene radical remaining after removal of hydroxyl groups from ethylene glycol, or (ii) a divalent radical remaining after removal of terminal hydrogen atoms from ethylene glycol. Each moiety has different molecular weight and, as such, each moiety can produce a different value.

Japanese laid-open application 2005-89572 teaches a method for producing polybutylene terephthalate by transesterifying bis (2-hydroxyethyl) terephthalate with 1,4-butane diol in the presence of a transesterification reaction catalyst under the pressure of 1-54 kPa at a final temperature ranging from 200-230 ° C. and then subjecting the reaction product to polycondensation. In one embodiment, the bis(2-hydroxyethyl)terephthalate is obtained by depolymerizing polyethylene terephthalate with excessive ethylene glycol, and purifying the depolymerized product. The patent teaches that transesterifying bis (2-hydroxyethyl) terephthalate with 1,4-butane diol under reduced pressure imparts favorable results.

Unfortunately, such documents do not meet the long felt need of improved use of PET scrap that is ordinarily incinerated or buried in landfills. U.S. Pat. No. 5,451,611, for instance, does not teach effective processes that enable PET to be able to be broken down into its constituent monomers or oligomers—a feature that is sometimes required by commercial considerations. U.S. Pat. No. 5,451, 611 does not provide meaningful guidelines for making compositions functionally similar to PBT containing ethylene glycol in amounts other than trace amounts and which exhibit melt ing temperatures that are higher than those shown in its examples. Similarly, U.S. Pat. No. 5,266,601 does not provide meaningful details about how to make effective PBT materials with ethylene glycol in amounts more than 1.0 wt. % or with other residues that can be found in some PET scrap. Also, U.S. Pat. No. 5,266,601 does not disclose to relatively more versatile processes that can use excess 1,4-butane diol, relative to the PET scrap used or that do not require that the diethylene glycol be "eliminated as completely as possible." Known technology relating to utilizing PET as scrap materials for making PBT-like materials, in other words, does not provide meaningful solutions that solve the long felt need of new processes for better utilizing PET scrap that is ordinarily incinerated or buried in landfills. Known technology does not provide meaningful solutions that solve the long felt need of new thermoplastic compositions containing fillers, PBT derived from PET and a combination of physical properties that are highly useful and valued by customers.

For the foregoing reasons, there is a need to develop improved processes that utilize PET.

For the foregoing reasons, there is a need to develop new processes for making PBT random copolymers having useful performance properties.

For the foregoing reasons, there is a need to develop new articles from molding compositions that utilize PBT derived from PET and that have useful performance properties.

BRIEF DESCRIPTION OF THE INVENTION

The invention relates to a process comprising:

depolymerizing a polyethylene terephthalate component selected from the group consisting of polyethylene terephthalate and polyethylene terephthalate copolymers with a 1,4-butane diol component at a temperature ranging from 180° C. to 230° C., under agitation, at a pressure that is at least atmospheric pressure in the presence of a catalyst component, at an elevated temperature, under an inert atmosphere, to produce a molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butane diol, ethylene glycol, and combinations thereof;

agitating the molten mixture at subatmospheric pressure and increasing the temperature of the molten mixture to an elevated temperature under conditions sufficient to form a modified random polybutylene terephthalate copolymer containing at least one residue derived from the polyethylene terephthalate component.

In another embodiment, the invention relates to a composition comprising a modified polybutylene terephthalate random copolymer that (1) is derived from a polyethylene terephthalate component selected from the group consisting of polyethylene terephthalate and polyethylene terephthalate copolymers and (2) at least one residue derived from the polyethylene terephthalate component, wherein the composition (i) has an intrinsic viscosity that is more than 0.55 dL/g
a melting temperature that is more than 200 C (ii) the at least one residue derived from the polyethylene terephthalate component includes a mixture of ethylene glycol groups, diethylene glycol groups and isophthalic acid groups at an amount ranging from more than 0 to 23 equivalents, relative to the total of 100 equivalents of diol and 100 equivalents of diacid groups in the modified polybutylene terephthalate random copolymer and from 0 ppm, or more than 0 ppm to less than 1000 ppm of an inorganic residue selected from the group consisting of antimony-containing compounds, germanium-containing compounds, titanium-containing compounds, cobalt-containing compounds, tin containing compounds, aluminum, aluminum salts, alkaline salts, alkali salts, phosphorous-containing compounds, phosphorous-containing anions, sulfur-containing compounds, sulfur-containing anions, and combinations thereof.

In another embodiment, the invention relates to a process comprising:

depolymerizing a polyethylene terephthalate component selected from the group consisting of polyethylene terephthalate and polyethylene terephthalate copolymers with a 1,4-butane diol component at a temperature ranging from 180° C. to 230° C., under agitation, at a pressure that is at least atmospheric pressure in the presence of a catalyst component, e.g., at an elevated temperature, under an inert atmosphere, to produce a molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butane diol, ethylene glycol, and combinations thereof;

agitating the molten mixture at subatmospheric pressure and increasing the temperature of the molten mixture to an elevated temperature under conditions sufficient to form a modified random polybutylene terephthalate copolymer containing at least one residue derived from the polyethylene terephthalate component wherein the 1,4-butane diol is used in step (a) in a molar excess amount, relatively to the PET component;

wherein the modified random polybutylene terephthalate copolymer contains a mixture of ethylene glycol groups, diethylene glycol groups and isophthalic acid groups at an amount ranging from more than 0 equivalents to 23 equivalents, relative to the total of 100 equivalents of diol and 100 equivalents of diacid groups in the modified polybutylene terephthalate random copolymer, and from more than 0 ppm to less than 1000 ppm of an inorganic residue selected from the group consisting of antimony-containing compounds, germanium-containing compounds, titanium-containing compounds, cobalt-containing compounds, tin-containing compounds, aluminum, aluminum salts, alkaline earth metal salts, alkali salts, phosphorous-containing compounds, phosphorous-containing anions, sulfur-containing compounds, sulfur-containing anions, and combinations thereof.

DETAILED DESCRIPTION OF THE INVENTION

The invention is based on the discovery that it is now possible to make a material that is derived from scrap polyethylene terephthalate that performs similarly to "virgin PBT" (PBT that is derived from monomers) in a novel and effective process. Unlike conventional methods for making virgin PBT, the PBT component made by the invention contains residues derived from polyethylene terephthalate or polyethylene terephthalate copolymers, e.g., ethylene glycol and isophthalic acid groups (components that are not present in virgin PBT). Despite producing a PBT that is structurally different from virgin, monomer-derived PBT, our modified PBT copolymers exhibit similar performance properties as monomer-derived PBT. Advantageously, modified random polybutylene terephthalate copolymers made from embodiments of the invention can impart excellent performance properties to molding compositions, while reducing non-renewable resource consumption, waste reduction and $CO_2$ emissions. These benefits are further enhanced when butane diol (BDO) derived from biomass resources are used. Further, we have discovered conditions and processes that do not require laborious steps such as removing diethylene glycol from PET scrap and/or maintaining the 1,4-butane diol:PET ratio at 1.0 or below when the PET is depolymerized, that are particularly suitable for making PBT copolymers having a melting temperature Tm that is more than 200 C—a useful property in numerous applications. We have also discovered surprising optimal levels of mixtures of residual diethylene glycol, ethylene glycol, and isophthalic acid groups, could be present and still used to make a useful PBT copolymer.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

All molecular weights in this application refer to number average molecular weight obtained with the polystyrene standard. Details of the technique include the following items: (i) Instrument: Waters 2695 separation module; (ii) Detector: Waters 2487 Dual Absorbance Ultraviolet Detector at 273 and 295 nanometers and Water 410 refractomer; (iii) Mobile phase: 5% hexafluoroisopropanol (HFIP)/95% chloroform; (iv) GPC columns: Polymer Labs PL HFIP gel 250×4.6 mm; (v) Flow rate: 0.3 mL/min; (vi) Injection volume 10 μL; (vii) Polystyrene standards: Polymer Lab's Easical PS-1, 580-7, 500,000 Da.

All ASTM tests and data are from the 2003 edition of the Annual Book of ASTM Standards unless otherwise indicated.

For the sake of clarity, the terms terephthalic acid group, isophthalic acid group, butane diol group, ethylene glycol group in formulas have the following meanings. The term "terephthalic acid group" (R') in a composition refers to a divalent 1,4-benzene radical (-1,4-($C_6H_4$)—) remaining after removal of the carboxylic groups from terephthalic acid-. The term "isophthalic acid group" (R") refers to a divalent 1,3-benzene radical (-(-1,3-$C_6H_4$)—) remaining after removal of the carboxylic groups from isophthalic acid. The "butane diol group" (D) refers to a divalent butylene radical (—($C_4H_8$)—) remaining after removal of hydroxyl groups from butanediol. The term "ethylene glycol group" (D') refers to a divalent ethylene radical (—($C_2H_4$)—) remaining after removal of hydroxyl groups from ethylene glycol. With respect to the terms "isophthalic acid group," "terephthalic acid group(s), "butane diol group(s)," "ethylene glycol group," and "diethylene glycol group" being used in other contexts, e.g., to indicate the weight % of the group in a composition, the term "isophthalic acid group(s)" means the group having the formula (—O(CO)$C_6H_4$(CO)—), the term "terephthalic acid group(s)" means the group having the formula (—O(CO) $C_6H_4$(CO)—), the term diethylene glycol group means the group having (—O($C_2H_4$)0($C_2H_4$)—), the term "butane diol group(s)" means the group having the formula (—O ($C_4H_8$)—), and the term "ethylene glycol groups(s)" means the group having formula (—O($C_2H_4$)—).

The modified polybutylene terephthalate component derived from polyethylene terephthalate (PET-derived modified PBT component) is (1) derived from polyethylene terephthalate component selected from the group consisting of polyethylene terephthalate and polyethylene terephthalate copolymers and (2) has at least one residue derived from the polyethylene terephthalate component. In one embodiment, the modified polybutylene terephthalate component can further be derived from a biomass-derived 1,4-butane diol, e.g. corn derived 1,4-butane diol or a 1,4-butane diol derived from a cellulosic material.

The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols; diacids; monomers used to make diols or acids, e.g., succinic acid; monomers used to make polymers; and the like. Biomass based butane diol can be obtained from several sources. For instance, the following process can be used to obtain biomass-based 1,4-butane diol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™". This succinic acid can be easily converted into 1,4-butane diol by processes described in several published documents such as in U.S. Pat. No. 4,096,156, incorporated herein in its entirety. Bio-mass derived-1,4-butane diol can also be converted to tetrahydrofuran, and further converted to polytetrahydrofuran, also known as polybutylene oxide glycol. Another process that describes converting succinic acid into 1,4-butane diol is described in Life Cycles Engineering Guidelines, by Smith et al., as described in EPA publication EPA/600/R-1/101 (2001).

The residue derived from the polyethylene terephthalate component, which is present in the modified polybutylene terephthalate component can be selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the 1,3-trans isomer of cyclohexane dimethanol, the 1,4-trans isomer of 1,4-cyclohexane dimethanol, alkali salts, alkaline earth metal salts, including calcium, magnesium, sodium and potassium salts, phosphorous-containing compounds and anions, sulfur-containing compounds and anions, naphthalene dicarboxylic acids, 1,3-propanediol groups, and combinations thereof Depending on factors such as polyethylene terephthalate and polyethylene terephthalate copolymers, the residue can include various combinations. In one embodiment, for instance, the residue includes mixtures of ethylene glycol and diethylene glycol. In another embodiment, the residue includes mixtures of ethylene glycol and diethylene glycol and isophthalic acid. In another embodiment, the residue includes cis isomer of 1,3-cyclohexane dimethanol, 1,4-cyclohexane dimethanol, trans isomer of 1,3-cyclohexane dimethanol, trans isomer of 1,4-cyclohexane dimethanol and combinations thereof And in another embodiment, the residue can be a mixture of ethylene glycol, diethylene glycol, isophthalic acid groups, cis isomer of cyclohexane dimethanol, trans isomer of cyclohexane dimethanol, and combinations thereof In one embodiment, the residue derived from polyethylene terephthalate includes mixtures of ethylene glycol, diethylene glycol and cobalt-containing compound. Such cobalt-containing compound mixture can also contain isophthalic acid groups.

In one embodiment, for instance, the modified polybutylene terephthalate component derived from polyethylene terephthalate (PET-derived modified PBT component, or modified polybutylene terephthalate copolymers containing residues derived from polyethylene terephthalate) that is made by the process of the invention is a random copolymer containing groups selected from the following groups:

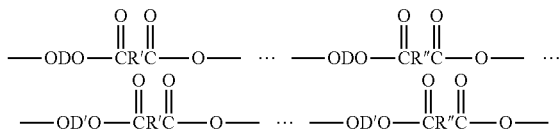

where R' is a terephthalic group(-1,4-$(C_6H_4)$-group)
R" is—an isophthalic acid group (1,3-$(C_6H_4)$—)
D is butane diol group(-$(C_4H_8)$—)
D' is ethylene glycol group(-$(C_2H_4)$—)

The modified polybutylene terephthalate copolymers containing residues derived from polyethylene terephthalate can also contain diethylene glycol groups.

The amount of the ethylene glycol groups, diethylene glycol groups, and the isophthalic groups in the polymeric backbone of the modified PBT component can vary. The PET-derived modified PBT component ordinarily contains isophthalic acid groups in an amount that is at least 0.1 mole % and can range from 0 or 0.1 to 10 mole % (0 or 0.07 to 7 wt. %). The PET-derived modified PBT component ordinarily contains ethylene glycol in an amount that is at least 0.1 mole % and can range from 0.1 to 10 mole %. (0.02 to 2 wt. %). In one embodiment, the PET-derived modified PBT component has an ethylene glycol content that is more than 0.85 wt. %. The modified PBT component can also contain diethylene glycol in an amount ranging from 0.1 to 10 mole % (0.04 to 4 wt. %). The amount of the butane diol groups is generally about 98 mole % and can vary from 95 to 99.8 mole % in some embodiments. The amount of the terephthalic acid groups is generally about 98 mole % and can vary from 90 to 99.9 mole % in some embodiments.

Unless otherwise specified, all molar amounts of the isophthalic acid groups and or terephthalic acid groups are based on the total moles of diacids/diesters in the composition. Unless otherwise specified, all molar amounts of the butane diol, ethylene glycol, and diethylene glycol groups are based on the total moles of diol in the composition. The weight percent measurements stated above are based on the way terephthalic acid groups, isophthalic acid groups, ethylene glycol groups, and diethylene glycol groups have been defined herein.

The total amount of materials of the polyethylene terephthalate component residue in the modified polybutylene random copolymer can vary. For instance, mixtures can be in an amount ranging from 1.8 to 2.5 wt. %, or from 0.5 to 2 wt. %, or from 1 to 4 wt. %. The ethylene glycol, diethylene glycol and cyclohexane dimethanol groups can be individually or in combination present in an amount ranging from 0.1 to 10 mole %, based on 100 mole % of glycol the molding composition. The isophthalic acid groups can be present in an amount ranging from 0.1 to 10 mole %, based on 100 mole % of diacid/diester in the molding composition.

It has been discovered that when it is desirable to make a polybutylene terephthalate copolymers having at melting temperature Tm that is at least 200° C., the total amount of diethylene glycol, ethylene glycol, and isophthalic acid groups should be within a certain range. As such, in one embodiment, the total amount of the diethylene glycol, ethylene glycol, and isophthalic acid groups in the modified polybutylene terephthalate component is more than 0 and less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 3 and less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 3 and less than or equal to 10 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 10 and less than or equal to 23 equivalents, relative to the total of 100 equivalents of diol and 100 equivalents of diacid groups in the modified polybutylene terephthalate random copolymer. In one embodiment, diethylene glycol, ethylene glycol and/or isophthalic acid can be added during the process.

It has also been discovered that the total amount of inorganic residues derived from the polyethylene terephthalate can be present in the range from more than 0 ppm and up to 1000 ppm. Examples of such inorganic residues can be selected from the group consisting of antimony-containing compounds, germanium-containing compounds, titanium-containing compounds, cobalt-containing compounds, tin-containing compounds, aluminum, aluminum salts, alkaline earth metal salts, alkali salts, including calcium, magnesium, sodium and potassium salts, phosphorous-containing compounds and anions, sulfur-containing compounds and anions, and combinations thereof In another embodiment, the amounts of inorganic residues can range from 250 to 1000 ppm. In another embodiment, the amounts of inorganic residues can range from 500 to 1000 ppm.

The PET component from which the modified polybutylene terephthalate random copolymer is made can be in any form that can be used according to our invention. Generally, the PET component includes recycle (scrap) PET in flake, powder/chip, film or pellet form. Before use, the PET is generally processed to remove impurities such as paper, adhesives, polyolefin, e.g., polypropylene, polyvinyl chloride (PVC), nylon, polylactic acid and other contaminants. Also, the PET component can include PET that is not waste in flake, chip or pellet form. As such, PET that would ordinarily be deposited in landfills can now be used productively and effectively. In one embodiment, PET component can also include other polyesters. The PET component can also include polyester copolymers. Examples of such materials include polyalkylene terephthalates that can be selected from polyethylene terephthalate, polycyclohexane terephthalate, copolyesters of terephthalate esters with comonomers containing cyclohexane dimethanol and ethylene glycol, copolyesters of terephthalic acid with comonomers containing cyclohexane dimethanol and ethylene glycol, polybutylene terephthalate, poly-xylylene terephthalate, polydianol terephthalates, polybutylene terephthalate, polytrimethylene terephthalate, polyester naphthalates, and combinations thereof.

The PET-derived modified PBT can be made by a process that involves reacting (i) a polyethylene terephthalate component with (ii) a 1,4-butane diol at a pressure that is at least atmospheric pressure in the presence of a catalyst component at a temperature ranging from 180° C. to 230° C. The reaction of the polyethylene terephthalate component with the 1,4-butane diol is carried out under inert atmosphere and under conditions that are sufficient to depolymerize the polyethylene terephthalate component into a molten mixture containing oligomers containing oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties. Polyester moieties and the 1,4-butane diol are combined in the liquid phase under agitation and the 1,4-butane diol can be continuously refluxed back into the reactor during step (a). In one embodiment, 1,4-butane diol is refluxed back into the reactor during step (a), and wherein excess butanediol, ethylene glycol and tetrahydrofuran are removed during step (b).

The polyethylene terephthalate component and the 1,4-butane diol component are generally combined under atmospheric pressure. In another embodiment of the invention, however, it is possible to use pressures that are higher than atmospheric pressures. For instance, in one embodiment, the pressure at which the polyethylene terephthalate component and the 1,4-butane diol are subjected to is 2 atmospheres, or higher.

The temperature at which the polyethylene terephthalate component and the 1,4-butane diol component are combined and reacted is sufficient to promote depolymerization of the polyethylene terephthalate component into polyethylene terephthalate and poly(butylene terephthalate) oligomers, 1,4-butane diol, and ethylene glycol. More particularly, the polyethylene terephthalate component can be depolymerized into oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties. The temperature at which the polyethylene terephthalate component and the 1,4-butane diol component are combined generally ranges from 180° C. to 230° C.

1,4-Butane diol is generally used in excess amount relative to the PET scrap. In one embodiment, 1,4-butane diol is used in a molar excess amount ranging from 2 to 20.

During the initial stage of the process when the polyethylene terephthalate component and the 1,4-butane diol are combined and reacted ("step (a)"), the polyethylene terephthalate component and the 1,4-butane diol depolymerize into a molten mixture at a pressure that is at least atmospheric pressure. 1,4-butane diol, ethylene glycol, are generally recirculated, and tetrahydrofuran is distilled during "step (a)" of the process. The molten mixture contains polyethylene terephthalate and poly(butylenes terephthalate) oligomers, 1,4-butane diol, and ethylene glycol. More particularly, the molten mixture includes oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties. In one embodiment, the polyethylene terephthalate component can be further depolymerized with ethylene glycol.

The duration of the step in which PET scrap reacts with 1,4-butane diol can vary, depending on factors, such as available equipment, production needs, desired final properties, and the like. In one embodiment, this step is carried out in at least 2 hours. In another embodiment, the step is carried out from 30 minutes or from 2 to 5 hours.

The process further includes the step of subjecting the molten mixture to subatmospheric pressure and increasing the temperature of the molten mixture to a temperature ranging from 240° C. to 260° C., and thereby forming a PET-derived modified PBT component having a polymeric backbone containing one or more of the following units:

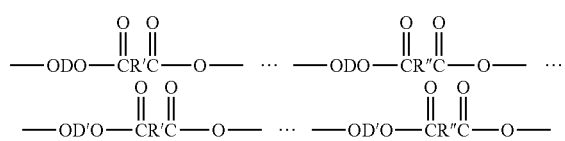

such that R' is an terephthalic acid group ($-1,4-C_6H_4-$),
R" is an isophthalic acid group ($-1,3-C_6H_4-$),
D is a butane diol group ($-(C_4H_8)-$), and
D' is an ethylene glycol group ($-(C_2H_4)-$).
The PET-derived modified PBT component can also contain diethylene glycol groups.

Excess butanediol, ethylene glycol and tetrahydrofuran (THF) are preferably removed and step (b) is carried out under agitation. Once the molten mixture forms, the molten mixture is placed in subatmospheric pressure conditions at a suitable temperature for a period that is sufficiently long for the molten mixture to polymerize into a PET-derived modified PBT polymer.

The molten mixture is placed under subatmospheric conditions. Generally, the pressure is reduced to less than 1 Torr. In one embodiment, the pressure is reduced to a pressure ranging from 100 to 0.05 Torr. In another embodiment, the pressure is reduced to a pressure ranging from 10 to 0.1 Torr.

Advantageously, the molten mixture can be placed under subatmospheric conditions without isolation and dissolution of any material from the molten mixture. The avoidance of this step greatly enhances the utility of the process.

During the step when the molten mixture is placed under subatmospheric conditions and the temperature is increased, excess butanediol, ethylene glycol and THF are removed from the reactor and oligomers are allowed to build in molecular weight. Agitation can be continuously provided to facilitate the removal of the low boiling components. After sufficient molecular weight is obtained, the resulting molten PBT polymer is dropped from the reactor, cooled, stranded and chopped into pellets.

The duration of the step (step (b) discussed above) in which the molten mixture polymerizes from polyethylene terephthalate and poly(butylene terephthalate) oligomers, 1,4-butane diol, and ethylene glycol can vary, depending on factors, such as equipment available, production needs, desired final properties, and the like. In one embodiment, this step is carried out in at least two hours. In another embodiment, the step is carried out from 30 minutes or from 2 to 5 hours.

The temperature at which the molten mixture is placed under subatmospheric conditions is sufficiently high to promote polymerization of the polyethylene terephthalate and poly(butylene terephthalate) oligomers, 1,4-butane diol, and ethylene glycol to the PET-derived modified PBT ("elevated temperature"). Generally, the temperature is at least 250° C. In one embodiment, the temperature ranges from 250° C. to 275° C.

Both steps of the process can be carried out in the same reactor. In one embodiment, however, the process is carried out in two separate reactors, where step (a) is carried out in a first reactor and when the molten mixture has formed, the molten mixture is placed in a second reactor and step (b) is carried out. In another embodiment, the process can be carried out in more than two reactors. In another embodiment, the process can be carried out in a continuous series of reactors. As such, the process can be carried out in at least two reactors.

The catalyst component that is used to facilitate the reaction of the process generally includes a catalyst that facilitates the reaction. The catalyst can be selected from antimony compounds, germanium-containing compounds, tin compounds, titanium compounds, combinations thereof as well as many other metal catalysts and combinations of metal catalysts that have been disclosed in the literature. The amount of the catalyst will vary on the specific need at hand. Suitable amounts of the catalyst range from 1 to 5000 ppm, or more.

The catalyst component is generally added during the step when the polyethylene

Terephthalate component initially combines with the 1,4-butane diol. In another embodiment, however, the catalyst component may be added to the molten mixture that forms after the polyethylene terephthalate component and the 1,4-butane diol component are combined.

The process for making the PET-derived modified PBT is preferably carried out under agitative conditions. The term "agitative conditions" or "agitation" refers to subjecting the polyethylene terephthalate component and the 1,4-butane diol or the molten mixture to conditions that involve physically mixing the polyethylene terephthalate component 1,4-butane diol or molten mixture under conditions that promote the depolymerization of the PET (when the agitative conditions are applied to polyethylene terephthalate component 1,4-butane diol "step (a)", or the polymerization of the PBT from polyethylene terephthalate oligomers, 1,4-butane diol, and ethylene glycol "step (b)." The physical mixing can be accomplished by any suitable way. In one embodiment, a mixer containing rotating shaft and blades that are perpendicular to the shaft can be used.

The process for making the PET-derived modified PBT component can include a step that reduces the amount of THF produced during the process by adding a basic compound containing an alkali metal to the reactor in step (a) and thereby reducing formation of THF.

The basic compound contains an alkali or alkaline earth metal compound or aluminium compound and can be selected from one or more of the following compounds sodium alkoxides, sodium hydroxide, sodium acetate, sodium carbonate, sodium bicarbonates, potassium alkoxides, potassium hydroxide, potassium acetate, potassium carbonate, potassium bicarbonate lithium alkoxides, lithium hydroxide, lithium acetate, lithium carbonate, lithium bicarbonate, calcium alkoxides, calcium hydroxide, calcium acetate, calcium carbonate, calcium bicarbonates, magnesium alkoxides, magnesium hydroxide, magnesium acetate, magnesium carbonate, magnesium bicarbonates, aluminium alkoxides, aluminium hydroxide, aluminium acetate, aluminium carbonate, aluminium bicarbonates, and combinations thereof.

The amount of the basic compound added to a mixture is generally at least 0.1 ppm. In one embodiment, the amount of the basic compound is from 0.1 to 50 ppm. In another embodiment, the amount of the basic compound ranges from 1 to 10 ppm.

The addition of the basic compound containing an alkali metal can reduce the amount of total THF production, as compared to when the process is carried out without the basic compound. In one embodiment, the total THF produced during the process is reduced by at least 10%, as compared to a process that does not use the basic compound. In another embodiment, the total THF produced during the process is reduced ranges from at least 10% to 50%, or more. In another embodiment, the THF is reduced from at least 10% to 50%.

In one embodiment, epoxies can be used to reduce THF formation during polymerization. Difunctional epoxies can be used in the amounts that are generally less than 1.0 wt %. In one embodiment, the amount of the difunctional epoxy can range from 0.01 wt % to 1.0 wt %. Examples of suitable difunctional epoxy compounds include and are not limited to difunctional epoxy compounds and include, but are not limited to, 3,4-epoxycyclohexyl-3,4-epoxycyclohexyl carboxylate, bis(3,4-epoxycyclohexylmethyl) adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl) adipate, butadiene diepoxide, vinylcyclohexene diepoxide, dicyclopentadiene diepoxide, and the like. Especially preferred is 3,4-epoxycyclohexyl-3,4 epoxycyclohexylcarboxylate.

The process for making the PET-derived modified PBT may contain an additional step in which the PBT formed from the molten mixture is subjected to solid-state polymerization. Solid-state polymerization generally involves subjecting the PBT formed from the molten mixture to an inert atmosphere and heating to a temperature for a sufficient period of time to build the molecular weight of the PBT. Generally, the temperature to which the PBT is heated is below the melting point of the PBT, e.g., from 5° C. to 60° C. below the melting point of the PBT. In one embodiment, such a temperature may range from 150° C. to 210° C. Suitable periods of time during which the solid-state polymerization occurs may range from 2 to 20 hours, depending on the conditions and equipment. The solid-state polymerization is generally carried out under tumultuous conditions sufficient to promote further polymerization of the PBT to a suitable molecular weight. Such tumultuous conditions may be created by subjecting the PBT to tumbling, the pumping of inert gas into the system to promote fluidization of polymer particle, e.g., pellets, chips, flakes, powder and the like. The solid-state polymerization can be carried out at atmospheric pressure and/or under reduced pressure, e.g. from 1 atmosphere to 1 mbar.

Remarkably, despite having residues derived from polyethylene terephthalate, e.g., ethylene glycol and isophthalic acid groups (groups that have long been regarded as undesired components in virgin PBT), the PET-derived modified PBT component exhibits useful properties. It is important to be aware that the PET derived PBT compositions of the invention are not "recycled," as the term is ordinarily used. That is, the compositions are not reprocessed PBT or PET. Rather, they are entirely new materials made from PET, a material that is fundamentally different from PBT. Also, the PET-derived modified PBT is structurally different from "virgin" PBT. Virgin PBT, for instance, is a non-random homopolymer. The modified PBT of this invention is a random copolymer. The physical properties of the PET-derived modified PBT will now be discussed.

The physical properties of the PET-derived modified PBT component can vary, depending on factors such as the performance properties that are required, the equipment used, process parameters, and the like. The intrinsic viscosity (IV) of the PET-derived modified PBT is at least 0.56 dL/g. In another embodiment, the intrinsic viscosity ranges from 1 to 1.3 dL/g. In another embodiment, the intrinsic viscosity ranges from 0.95 to 1.05 dL/g. All intrinsic viscosities in this application refer to those viscosities measured in a solution of 60 wt. % phenol and 40 wt. % 1,1,2,2-tetrachloroethane at 25° C.

The melting point of the PET-derived modified PBT is at least 200° C. or at least 210° C. In another embodiment, the melting point ranges from 200° C. or from 204° C. to 210° C. or 218° C. In another embodiment, the melting point ranges from 211° C. to 223° C. The crystallization temperature of the PET-derived modified PBT is at least 150° C. In another embodiment, the crystallization temperature ranges from 162° C. to 175° C. In another embodiment, the crystallization temperature ranges from 164° C. to 178° C.

The flexural modulus of the PET-derived modified PBT is at least 1000 MPa. In another embodiment, the flexural modulus ranges from 1000 MPa to 5000 MPa. In another embodiment, the flexural modulus ranges from 2400 to 2500 MPa. The tensile strength (at yield) of the PET-derived modified PBT is at least 30 MPa. In another embodiment, the tensile strength ranges from 30 MPa to 100 MPa. In another embodiment, the tensile strength ranges from 51 to 53 MPa. The tensile elongation (at yield) of the PET-derived modified PBT is at least 2%.

In another embodiment, the tensile elongation (yield, break) ranges from 2% to 10%. In another embodiment, the tensile elongation (at yield) ranges from 3 to 3.3%. The heat deflection temperature of the PET-derived modified PBT generally ranges from at least 45° C. or 60° C. at 1.82 MPa for 3.2 mm bars. In another embodiment, the heat deflection temperature ranges from 45° C. to 65° C. or 75° C. In another embodiment, the heat deflection temperature ranges from 60° C. to 70° C. The notched Izod strength temperature of the PET-derived modified PBT is at least 20 J/m. In another embodiment, the notched Izod strength ranges from 20 J/m to 60 J/m. In another embodiment, the notched Izod strength ranges from 27 to 45 J/m.

The molecular weight of the PET-derived modified PBT is generally at least 3000 g/mol. In one embodiment, the molecular weight of the PET-derived modified PBT ranges from 18000 to 25000 or 42000 g/mol. In another embodiment, the molecular weight of the PET-derived modified PBT ranges from 30000 to 42000 or 50000 g/mol.

When subjected to solid state polymerization step, the molecular weight of the PET-derived modified PBT is generally at least 15000 g/mol. In one embodiment, the molecular weight of the PET-derived modified PBT that has been subjected to solid state polymerization ranges from 18000 to 42000 g/mol. In another embodiment, the molecular weight of the PET-derived modified PBT that has been subjected to solid state polymerization ranges from 20000 to 50000 g/mol.

In addition to providing a novel process for making PBT from PET, the invention includes embodiments directed to compositions made from such a process. In one embodiment, the PBT formed is a composition that includes a white, non-yellow, PET-derived modified PBT containing isophthalic acid groups and ethylene glycol groups, such that the composition has an intrinsic viscosity that is at least 0.55 dL/g or more than 0.55 dL/g and the isophthalic acid groups and the ethylene glycol are present in an amount that is more than 0.85 wt. %. The intrinsic viscosity can vary and, advantageously, the process makes it possible to make polymers with a wide range of higher intrinsic viscosities, e.g., from 0.55 to 1.3 dL/g, or 1.5 dL/g or higher.

In another embodiment, the composition can comprise (1) a modified polybutylene terephthalate random copolymer that is derived from a polyethylene terephthalate component selected from the group consisting of polyethylene terephthalate and polyethylene terephthalate copolymers and (2) at least one residue derived from the polyethylene terephthalate component, wherein the composition (i) has an intrinsic viscosity that is more than 0.55 dL/g a melting temperature that is more than 200° C. (ii) a mixture of ethylene glycol groups, diethylene glycol groups and isophthalic acid groups at an amount ranging from more than 0 equivalents to 23 equivalents, relative to the total of 100 equivalents of diol and 100 equivalents of diacid groups in the modified polybutylene terephthalate random copolymer, less than 1000 ppm of an inorganic residue selected from the group consisting of antimony-containing compounds, germanium-containing compounds, titanium-containing compounds, cobalt-containing compounds, tin containing compounds, aluminum, aluminum salts, alkali salts, alkaline earth metal salts, phosphorous-containing compounds, phosphorous-containing anions, sulfur-containing compounds, sulfur-containing anions, and combinations thereof.

Other compositions can also be made by our process. In one embodiment, our process can produce a polyalkylene phthalate, modified polybutylene terephthalate random copolymer, such that the phthalate has a crystallization temperature, as measured by differential scanning calorimetry (DSC) using ASTM method D3418 with a cooling rate of 20° C./minute, of from 120 to 190° C. The phthalate can have a heat of crystallization of at least 10 J/g. The polyalkylene phthalate can have a content of carboxylic acid ester units derived from the group consisting of diethylene, glycol, isophthalic acid, cyclohexane dimethanol, or mixtures thereof, that is less than 5 mole %.

In one embodiment, the phthalate further comprising from 0.01 to 5.0 wt. % of a talc. The talc can have a particle size of from 0.5 to 10 microns. In one embodiment, the talc has less than 0.1% of a fibrous magnesium silicate containing contaminant.

Still yet in other embodiments our process can produce a polyalkylene phthalate having both hydroxy and carboxylic acid end groups wherein the total of said end groups is from 10 to 100 milliequivalents per kilogram of resin. In such a phthalate, the hydroxy end group concentration is at least 1.5 times the carboxylic acid end group concentration.

In another embodiment, our process can produce a polyalkylene phthalate having a yellowness index (YI), as measured by ASTM method D1003 at 3.1 mm, of less than 10.

And embodiments of the invention also encompass methods for making such compositions, which involve:

(a) depolymerizing a polyethylene terephthalate component with a 1,4-butane diol component at a temperature ranging from 180° C. to 230° C., under agitation, at a pressure that is at least atmospheric pressure in the presence of a catalyst component, at an elevated temperature, under an inert atmosphere, to produce a molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties; and (b) agitating the molten mixture at subatmospheric pressure and increasing the temperature of the molten mixture to an elevated temperature under conditions sufficient to form the modified random polybutylene terephthalate copolymer.

In use, a suitable amount of a polyethylene terephthalate reacts with an excess amount of a diol component selected from the group of ethylene glycol, 1,4-butane diol, and combinations thereof, at a pressure that is at least atmospheric pressure in the presence of a catalyst component at a temperature ranging from 180° C. to 230° C. A suitable inert atmosphere is selected and the conditions are such that the polyethylene terephthalate depolymerizes into a molten mixture containing polyethylene terephthalate oligomers, the diol such as 1,4-butane diol, and ethylene glycol.

The polyethylene terephthalate component and the added diol such as 1,4-butane diol are combined in the liquid phase under agitation and the added diol such as 1,4-butane diol is continuously refluxed back into the reactor during this step. If the added diol is different from 1,4-butane diol, this step is preferably modified to include the step of removing the added diol under reduced pressure followed by incorporation of 1,4-butane diol into the reaction mixture. When the molten mixture has formed, the molten mixture is subjected to subatmospheric pressure and the temperature of the system increases to a temperature ranging from 250° C. to 260° C., and thereby forming a PET-derived modified PBT component containing the isophthalic acid groups and ethylene glycol groups integrated into its backbone. Excess butanediol, ethylene glycol and THF are removed during step (b). Step (b) is carried out under agitation.

Both steps of the process can be carried out in the same reactor. In one embodiment, however, the process is carried out in two separate reactors, where step (a) is carried out in a first reactor and when the molten mixture has formed, the molten mixture is placed in a second reactor and step (b) is carried out.

The amounts of PET-derived modified PBT that can be made from the invention can vary with factors such as production needs, equipment, available materials and the like. Nonetheless, the invention contains embodiments in which the amounts are sufficiently high for various commercial applications. In one embodiment, the process produces at least 200 kilograms PET-derived modified PBT per hour. In another embodiment, the process can produce from 500 to 1000 kilograms PET-derived modified PBT/per hour. In another embodiment, the process can from produce from 1000 to 2000 kilograms PET-derived modified PBT per hour.

Our invention can also encompass various versions of the process. In one embodiment, the invention relates to a process comprising:
(a) depolymerizing a polyethylene terephthalate component selected from the group consisting of polyethylene terephthalate and polyethylene terephthalate copolymers with a 1,4-butane diol component, under agitation, at a pressure that is at least atmospheric pressure in the presence of a catalyst component, at an elevated temperature, under an inert atmosphere, to produce a molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties;

(b) agitating the molten mixture at subatmospheric pressure and increasing the temperature of the molten mixture to a temperature ranging from 240° C. to 260° C., and thereby forming a modified random polybutylene terephthalate copolymer containing at least one residue derived from the polyethylene terephthalate component selected from the group consisting of ethylene glycol groups, diethylene glycol groups, isophthalic acid groups, antimony-containing compounds, germanium-containing compounds, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the 1,3-trans isomer of cyclohexane dimethanol, the 1,4-trans isomer of 1,4-cyclohexane dimethanol, sodium benzoate, alkali salts, phosphorous-containing compounds, naphthalene dicarboxylic acids, 1,3-propane diol groups, cobalt-containing compounds, and combinations thereof;
wherein step (a) is carried out at a temperature ranging from 180° C. to 230° C.;
wherein the process has a $CO_2$ reduction index ranging from 1.3 kg to 2.2 kg; and
wherein the modified polybutylene terephthalate random copolymer has an ethylene glycol content that is more than 1 wt. %.

Although the foregoing description has been directed to processes for making modified PBT materials from PET, and respective processes for making such materials, the scope of the invention includes processes for making polyesters other than PBT from PET. Examples of other polyesters include polycyclohexane terephthalate glycol (PCTG) polycyclohexane terephthalate (PCT), polyethylene terephthalate glycol, (PETG); polytrimethylene terephthalate (PTT), poly-xylene terephthalate (PXT), polydianol terephthalate (PDT).

As such, in one embodiment, the invention includes a process for making PTT that involves the steps of:
(a) reacting (i) a polyethylene terephthalate component with (ii) a 1,3-propanediol at a pressure that is at least atmospheric pressure in the presence of a catalyst component at a temperature ranging from 180° C. to 260° C., under an inert atmosphere, thereby depolymerizing the polyethylene terephthalate component into a molten mixture containing polyethylene terephthalate oligomers, polypropylene terephthalate oligomers, 1,3-propanediol, and ethylene glycol and/or combinations thereof;
wherein the polyethylene terephthalate component and the 1,3-propanediol are combined in the liquid phase under agitation and the 1,3 propanediol is refluxed back into the reactor during step (a);
(b) subjecting the molten mixture to subatmospheric pressure and increasing the temperature of the molten mixture to a temperature ranging from 240° C. to 270° C., and thereby forming a PET-derived PTT component selected from one or more of the following groups:

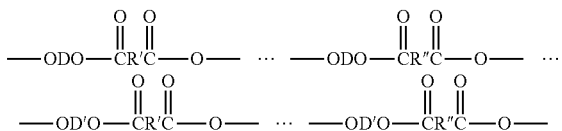

wherein R' is a terephthalic acid group (-1,4-$(C_6H_4)$—),
R" is an isophthalic acid group (-1,3-$(C_6H_4)$—),
D is a divalent propylene radical (—$C_2H_4$—), and D' is a divalent ethylene radical;
wherein excess propanediol and ethylene glycol are removed during step (b) and wherein step (b) is carried out under agitation.

The invention provides previously unavailable advantages. For instance, the invention provides a process that is relatively simple and effective at producing relatively large amounts of PET-derived modified polyesters, such as modified PBT efficiently. The process of the invention requires specific conditions found to be critical for avoiding disadvantages of processes disclosed in the prior art. For instance, it is not necessary in our process to have diethylene glycol units in the starting PET "eliminated as completely as possible," as disclosed by U.S. Pat. No. 5,266,601. Our process can produce useful modified random polybutylene terephthalate copolymers under conditions where the 1,4-butane diol:PET molar ratio is more than 1.0 when the PET component is depolymerized, thereby providing a flexible versatile system. Also, our invention provides a flexible system in which a PBT copolymer can contain mixtures of diethylene glycol groups, ethylene glycol groups, and isophthalic acid groups and still make PBT copolymers having useful properties.

Further, the process for making the PET-derived random, modified PBT copolymers can advantageously substantially reduce carbon dioxide emissions and solid waste. Since the PET-derived polyester random modified PBT copolymers made by the inventive process are made from scrap PET and not monomers, the process significantly reduces the amount of carbon dioxide emissions and solid waste. Carbon waste reduction (or crude oil savings) occurs because the carbon that constitutes the dimethyl terephthalate or terephthalic acid ordinarily used to make polyesters is not used, rather a PET component, e.g., polyester scrap, is replaced. The process to make DMT or TPA from crude oil is highly energy intensive and as a result, substantial emissions of CO2 to the atmosphere occur from burning of non-renewable energy sources. By not using DMT or TPA to make the PET derived PBT, carbon dioxide emissions savings are obtained In one embodiment, the process for making PET-derived modified PBT can eliminate at least 1 kg of $CO_2$ emissions for every kilogram of PET-derived modified PBT made with the process, as compared to a process that makes virgin PBT homopolymers from monomers. In another embodiment, the process for making PET-derived modified PBT can eliminate from 1 kg to 1.5 kg, or more $CO_2$ emissions for every kilogram of PET-derived modified PBT made with the inventive process, as compared to a process that makes virgin PBT homopolymers from monomers. Additionally, there are energy savings/reduced carbon dioxide emissions when the ethylene glycol byproduct is recovered and is used instead of ordinary ethylene glycol in manufacturing.

Additionally, when the source of BDO is from biomass derived, feedstocks such as succinic acid, the carbon dioxide savings are further increased for two reasons. Bio derived succinic acid is made form sugars or other bio derived hydrocarbons that are the derived from atmospheric carbon vs. fossil fuel carbon sources, this reducing the environmental impact of the polymer derived from BDO based on succinic acid from biomass sources. Furthermore, the fermentation to yield succinic acid requires carbon dioxide as an input thus leading to further carbon dioxide reductions.

Advantageously, a modified polybutylene terephthalate random copolymers can have a reduced $CO_2$ emissions index. The reduced $CO_2$ emissions index, as defined in this application, is the amount of $CO_2$, expressed in kg, that is saved when one (1) kg of a composition containing the modified polybutylene terephthalate random copolymers is made, as compared to the amount of $CO_2$, expressed in kg, that is created when the composition is made with polybutylene terephthalate that is derived from monomers. Generally, the modified PBT random copolymers have a reduced $CO_2$ emissions index that is more than approximately 1.3 kg, and can range from 1.3 kg to 2.5 kg.

The basis for this feature is discussed below. The difference between the amount of $CO_2$ that is created during ordinary processes for making virgin, monomer-derived PBT and the process for making 1 kg of the modified polybutylene terephthalate random copolymers can range from 1.3 kg to 2.5 kg, or more suitably from 1.7 kg to 2.2 kg. It should be noted that this difference is based on calculations for the entire process that starts from crude oil to the monomers to the PBT versus scrap PET to oligomers to the modified PBT. In other words, the process for making 1 kg of the modified polybutylene terephthalate random copolymers creates 1.3 to 2.5 kg less $CO_2$ as compared to the process for making 1 kg of virgin PBT from crude oil.

These results can be derived and verified by using material and energy balance calculations (calculations that are well know in the chemical engineering art) and comparing the amount of energy used to make modified PBT random copolymers from PET and the amount of energy used to make PBT from terephthalic acid.

The invention is further described in the following illustrative examples in which all parts and percentages are by weight unless otherwise indicated.

EXAMPLE 1

Small-Scale Process (BDO:PET=2.9:1)

Green colored recycle PET pellets were obtained from St. Jude, a supplier in North America. The post consumer recycle PET pellets had an iv specification of 0.68 to 0.78 dL/g and a melting point specification of 245 to 255° C. The 1,4-butane diol was obtained from BASF and had a purity specification of >99.5 wt. %. The TPT catalyst is the commercial Tyzor grade available from DuPont.

100 g of recycle PET pellets were mixed with 134 g of 1,4-butane diol (molar ratio 2.9:1) in a 500 mL reaction kettle. The temperature of the oil bath (for the reaction kettle) was ramped up from 180 to 255° C. The agitator speed was set at 20 rpm. At this stage, 0.2 ml of TPT catalyst was also added to the reaction mix. The reaction mass achieved a temperature of 227° C. (boiling point of butanediol) and the BDO was refluxed at this temperature for 2 hours. This is known as the PET glycolysis stage.

For the poly stage, the reflux condenser was removed and a vacuum was applied to the reaction kettle. The volatilized solvents were collected in a separate condenser. The speed of the agitator was increased to 220 rpm. The system pressure was brought down to 0.15 Torr (0.199 kPa) by the vacuum pump. The polymer molecular weight increased rapidly at this stage as was evident by the rod climbing of the molten mass. The reaction was stopped after 20 minutes in the poly stage. About 10 g of the polymer was collected from the reaction kettle for further testing and analysis. Results of tests conducted on the polymer samples include intrinsic viscosity (iv) data, composition of the polymer by NMR analysis and Crystallization data by DSC analysis and they are presented in Table 2. Results for the melt volume rate (MVR) at 250° C. for 5 kg are presented in Tables 4 and 6.

EXAMPLE 2

Pilot Plant Process (BDO:PET=2.9:1)

A modified polybutylene terephthalate random copolymer was derived from a polyethylene terephthalate component at larger scale in a helicone reactor. The helicone reactor had a capacity of 40 liters and was equipped with a special design of twin opposing helical blades with 270 degree twist; constructed of 316 SS with 16 g polish finish. The blade speed could be varied from 1 to 65 rpm. The agitators were connected to a 7.5 HP Constant Torque Inverter Duty Motor, which operates at 230/460 VAC, 3 PH and 60 Hz. These agitators provided excellent surface area for the polymer melt in order to build molecular weight. The helicone was also designed with an overhead condenser to condense the vapors in the glycolysis, transesterification (if any) and polymerization stages.

25 lb (11.4 kg) of recycle PET pellets with 35 lb (15.9 kg) of 1,4-butane diol (molar ratio 2.9:1) were charged to the helicone reactor. 4.6 mL (100 ppm as Ti) of TPT catalyst were also added to the reaction mix. The temperature of the heating oil (for the helicone) was set to 250° C. The agitator speed was set at 67% of maximum. The butanediol was refluxed into the reactor for 2 hours. It should be noted that the design of the overhead condenser system did not allow a complete reflux of the 1,4-butane diol. As a result, about 5 to 10 lb (2.3 to 4.5 kg) of 1,4-butane diol evolved in the initial stages could not be refluxed. The 1,4-butane diol evolved after that could be completely refluxed into the reactor.

For the polymerization stage (also referred to in this draft as 'poly stage'), a vacuum was applied to the helicone reactor and the reflux of butanediol to the reactor was discontinued. The speed of the agitator was set to 60% of max and the target amps of the motor were 3.5 amps. The logic for changes in agitator speed as the molecular weight of the polymer built up is shown in Table 3. The system pressure was brought down to 0.5 Torr (0.066 kPa) by the vacuum blower. The reaction was carried out until the polymer mass reached its $3^{rd}$ build. The reaction was stopped after 15 minutes into the $3^{rd}$ build and the polymer was cast in blobs. The products were then allowed to dry and ground into pellets. The following tests were conducted on the polymer sample: iv measurement, NMR analysis and DSC analysis.

EXAMPLES 3-10

These examples were generated primarily to understand the effect of presence of higher levels of ethylene glycol in the PET derived PBT. Examples were generated both at lab scale as well as the pilot plant scale to study impact of ethylene glycol residual on PBT properties. Both virgin PET as well as recycled PET was used as feedstocks for the transformation to PET derived PBT. Examples 3, 7, 10 and 11 were generated with recycle PET pellets whereas examples 4, 5 and 6 were generated with virgin PET. In examples 8 and 10, ethylene glycol had to be added externally to the reaction mixture to be able to obtain a PET derived PBT copolymer with a high ethylene glycol content.

EXAMPLE 3

Pilot Plant Process (BDO:PET=2:1)

A procedure similar to that described in Example 2 was followed for Example 3 (Helicone reactor). A lower BDO to PET molar ratio of 2:1 was used for this reaction. The resulting properties of the PBT synthesized by this reaction are shown in Table 2.

EXAMPLES 4, 5 and 6

Pilot Plant Process (Another PET Source, Three Different BDO:PET Ratios)

The best properties for PBT (via the PET route) may be obtained if one uses virgin PET as a starting material. A few experiments were carried out with virgin PET to determine the best in class performance that is possible via this novel PBT synthesis technique. The virgin PET used for this set of experiments was obtained from DAK and had an iv of 0.83. Three different ratios of BDO to PET (2.9:1, 2:1 and 1.5:1) were used for the examples 4, 5 and 6. A procedure similar to that in Example 2 was followed to synthesize the PBT. The resulting properties have been shown in Table 2.

Example A is comparative data measured on commercial PBT 315 grade manufactured by GE Plastics from its monomers.

TABLE 1

| | | | | | | | | |
|---|---|---|---|---|---|---|---|---|
| Raw material amount details used for the Examples 1-6 (PET derived PBT) | | | | | | | | |
| Item | Parameter | Unit | 1 | 2 | 3 | 4 | 5 | 6 |
| Raws | Polyester Type | | Recycled PET | Recycled PET | Recycled PET | Virgin PET | Virgin PET | Virgin PET |
| | BDO:PET Ratio | | 2.9:1 | 2.9:1 | 2:1 | 2.9:1 | 2:1 | 1.5:1 |
| | PET Weight | kg | 0.1 | 11.4 | 11.4 | 11.4 | 11.4 | 15.9 |
| | BDO Weight | kg | 0.134 | 15.9 | 10.7 | 15.9 | 10.6 | 11.2 |
| | TPT as Ti element | ppm | 291 | 59 | 59 | 59 | 59 | 62 |

TABLE 2

Differential scanning calorimetry (DSC), Intrinsic viscosity (IV) and composition data by NMR of the Examples 1-6 and Comparative Example A

| Item | Parameter | Unit | Comparative Example A (Commercial GE PBT 315) | Ex. 1 | Ex 2 | Ex. 3 | Ex. 4 | Ex. 5 | Ex. 6 |
|---|---|---|---|---|---|---|---|---|---|
| DSC Data | Melting Point | (° C.) | 222.6 | 213.6 | 213.4 | 204.5 | 218.2 | 210.48 | 201.0 |
| | Crystallization Temp | (° C.) | 168.3 | 167.9 | 168.5 | 158.8 | 176.8 | 167.3 | 164.0 |
| | DH fusion | (° C.) | 38.4 | 35.8 | 29.4 | 27.1 | 37.7 | 32.9 | 29.0 |
| | DH crystallization | (kJ/kg) | 39.9 | 37.4 | 37 | 33.4 | 38.9 | 35.6 | 33.3 |
| Intrinsic Viscosity | Iv | dL/g | 1.2 | 1.0 | — | 1.1 | 1.0 | 1.10 | 1.1 |
| Composition by | EG Repeat Unit | mol % | 0.0 | 2.3 | 1.2 | 5.3 | 1.1 | 4.6 | 9.5 |
| NMR analysis | DEG Repeat Unit | mol % | 0.0 | 0.3 | 0.6 | 0.5 | 0.4 | 0.4 | 0.4 |
| based on total | BDO Repeat Unit | mol % | 50.0 | 47.0 | 48.2 | 44.2 | 48.2 | 44.6 | 39.7 |
| diol and diacid units) | Isophthalic Repeat Unit | mol % | 0.0 | 1.2 | 1.1 | 1.2 | 0.0 | 0.0 | 0.0 |
| | Terephthalic Repeat Unit | mol % | 50.0 | 49.1 | 49.0 | 48.9 | 50.3 | 50.4 | 50.4 |
| | Total Comonomers | mol % | 0.0 | 3.8 | 2.9 | 7.0 | 1.5 | 5.0 | 9.9 |
| | Total Comonomer Equivalents | ** | 0.0 | 7.6 | 5.8 | 14.0 | 3 | 10.0 | 19.8 |

** Residual Equivalents relative to the total of 100 equivalents of diol and 100 equivalents of diacid groups

TABLE 3

Logic for Agitator Speed vs. Polymer MW Buildup

| Stage | Build | Agitator Speed | Target Amp | Rpm |
|---|---|---|---|---|
| Ester Interchange | N/A | 66.7% | N/A | 34 |
| Polymerization | $1^{st}$ | 60% | 3.5 | 32 |
| | $2^{nd}$ | 30% | 3.8 | 16 |
| | $3^{rd}$ | 18% | 4.5 | 9 |

EXAMPLE 7

Pilot Plant Process (BDO:PET=1.5:1)

A procedure similar to that described in Example 2 was followed for Example 7 (Helicone/Pilot Plant Reactor) using recycle PET. A lower BDO:PET molar ratio of 1.5:1 was used for this reaction. The weights of the starting monomers used for examples 7, 8, 9 and 10 are listed in Table 4. The resulting properties of the PBT synthesized by these reactions are shown in Table 5.

EXAMPLE 8, 9 and 10

Small-Scale Process (Three Different Diol:PET Ratios)

A procedure similar to that described in Example 1 was followed for Examples 8, 9 and 10 (Lab Scale). Two different diol to PET molar ratios (2.68:1, 0.60:1, and 2.67:1) were used for this reaction. The resulting properties of the PBT synthesized by these reactions are shown in Table 5.

TABLE 4

Raw material amount details used for the Examples 7-10 (PET derived PBT)

| Item | Parameter | Unit | 7 | 8 | 9 | 10 |
|---|---|---|---|---|---|---|
| Raws | Polyester Type | | Recycled PET | Reycled PET | Recycled PET | Virgin PET |
| | Diol:Ester Mole Ratio | | 1.5:1 | 2.67:1 | 0.60:1 | 2.67:1 |
| | PET Weight | kg | 15.9 | .10 | .10 | .10 |
| | BDO Weight | kg | 11.2 | 0.019 | 0.0281 | 0.0314 |
| | EG Weight | kg | 0 | 0.073 | 0 | 0.0646 |
| | TPT as Ti element | ppm | 59.1 | 174 | 1755 | 177 |

TABLE 5

Differential scanning calorimetry (DSC), Intrinsic viscosity (IV) and composition data by NMR of the Examples 7-10 and Comparative Example A

| Item | Parameter | Unit | Ex A * | Ex. 7 | Ex. 8 | Ex. 9 | Ex. 10 |
|---|---|---|---|---|---|---|---|
| DSC Data | Melting Point | °C. | 222.6 | 199.6 | 176.9 | 174.4 | 180.0 |
| | Crystallization Temp | °C. | 168.3 | 132.6 | 136.5 | 98.5 | 99.3 |
| | Glass Transition Temp | °C. | 0.0 | ND | 47.2 | 47.6 | 49.1 |
| | DH fusion | °C. | 38.4 | 23.6 | 15.5 | 21.3 | 23.4 |
| | DH crystallization | kJ/kg | 39.9 | 35.2 | 9.5 | 21.5 | 22.0 |
| Intrinsic Viscosity | Iv | dL/g | 1.2 | 1.0 | 0.74 | 0.87 | 0.71 |
| Composition by NMR analysis based on total diol and diacid units) | EG Repeat Unit | mol % | 0.0 | 10.4 | 25.2 | 27.1 | 31.4 |
| | DEG Repeat Unit | mol % | 0.0 | .2 | 0 | 0 | 0 |
| | BDO Repeat Unit | mol % | 50.0 | 39.9 | 25.4 | 22.9 | 19.3 |
| | Isophthalic Repeat Unit | mol % | 0.0 | 1.0 | 1.1 | 1.3 | .8 |
| | Terephthalic Repeat Unit | mol % | 50.0 | 48.5 | 48.3 | 48.8 | 48.5 |
| | Total Comonomers | mol % | 0.0 | 11.6 | 26.3 | 28.4 | 32.2 |
| | Total Comonomer Equivalents | ** | 0.0 | 23.2 | 52.6 | 56.8 | 64.4 |

* Comparative; (Commercial GE PBT 315)
** Residual Equivalents relative to the total of 100 equivalents of diol and 100 equivalents of diacid groups

EXAMPLES 11-15

These examples were generated primarily to understand the effect of presence of higher levels of isophthalic unit in the PET derived PBT. Examples were generated both at lab scale as well as the pilot plant scale to study impact of isophthalic residual on PBT properties. Different levels of dimethyl isophthalate or isophthalic acid were added to the reaction mixture purposely to simulate the impact of high isophthalate unit residuals in PET derived PBT copolymer.

EXAMPLES 11-12

Pilot Plant Process (Different IPA:(PET+IPA) Molar Ratios)

One can also control the isophthalic repeat unit quantity by adding Isophthalic Acid or Dimethyl Isophthalate. Two different ratios of IPA to PET (0.049:1 and 0.098:1) as shown above were used for Examples 11 and 12. The weights of the starting monomers used for examples 11-15 are listed in Table 6. A procedure similar to that in Example 2 was followed to synthesize the PBT with isophthalic acid being added along with the PET and BDO. The resulting properties have been shown in Table 7.

EXAMPLES 13-15

Small-Scale Process (Different IPA:(IPA+PET) Ratios)

A procedure similar to that described in Example 1 was followed for Examples 13-15 (lab scale). Three different IPA:(PET+IPA) molar ratios (0.40:1, 0.73:1, and 0.85:1) were used for this reaction. The resulting properties of the PBT synthesized by these reactions are shown in Table 7.

TABLE 6

Raw material amount details used for the Examples 11-15 (PET derived PBT)

| Item | Parameter | Unit | 11 | 12 | 13 | 14 | 15 |
|---|---|---|---|---|---|---|---|
| Raws | Polyester Type | | Recycled PET | Recycled PET | Recycled PET | Recycled PET | Recycled PET |
| | IPA:(PET + IPA) Ratio | | .049:1 | .098:1 | .40:1 | .73:1 | .85:1 |
| | PET Weight | kg | 11.6 | 11.6 | .10 | .05 | .05 |
| | BDO Weight | kg | 16.8 | 16.8 | .345 | .235 | .467 |
| | IPA Weight | kg | 0.52 | 1.04 | 0 | .118 | 0 |
| | DMI Weight | kg | 0 | 0 | .067 | 0 | .286 |
| | TPT as Ti element | ppm | 52.5 | 50.1 | 100 | 100 | 100 |

TABLE 7

Differential scanning calorimetry (DSC) and composition data by NMR of the Examples 11-15 and Comparative Example A

| Item | Parameter | Unit | A | Ex. 11 | Ex. 12 | Ex. 13 | Ex. 14 | Ex. 15 |
|---|---|---|---|---|---|---|---|---|
| DSC Data | Melting Point | °C. | 222.6 | 210.9 | 203.1 | 143.6 | ND | ND |
| | Crystallization Temp | °C. | 168.3 | 149.9 | 139.7 | 75.8 | ND | ND |
| | Glass Tansition Temp | °C. | 0.0 | 0.0 | 0.0 | 25.1 | 17.7 | 20.5 |
| | DH fusion | °C. | 38.4 | 24.79 | 23.65 | 12.93 | ND | ND |
| | DH crystallization | kJ/kg | 39.9 | 38.73 | 33.36 | 19.59 | ND | ND |

TABLE 7-continued

Differential scanning calorimetry (DSC) and composition data
by NMR of the Examples 11-15 and Comparative Example A

| Item | Parameter | Unit | A | Ex. 11 | Ex. 12 | Ex. 13 | Ex. 14 | Ex. 15 |
|---|---|---|---|---|---|---|---|---|
| Intrinsic Viscosity | Iv | dL/g | 1.2 | 1.1 | 1.2 | 1.1 | 0.7 | .96 |
| Composition by | EG Repeat Unit | mol % | 0.0 | 2.8 | 2.9 | 1.0 | 0.3 | 1.1 |
| NMR analysis | DEG Repeat Unit | mol % | 0.0 | .2 | .2 | 0 | 0 | 0 |
| based on total | BDO Repeat Unit | mol % | 50.0 | 47.5 | 47.4 | 48.9 | 50.4 | 48.9 |
| diol and diacid | Isophthalic Repeat Unit | mol % | 0.0 | 3.4 | 5.5 | 20.7 | 33.5 | 41.7 |
| units) | Terephthalic Repeat Unit | mol % | 50.0 | 46.2 | 44.1 | 29.4 | 15.8 | 8.3 |
|  | Total Comonomers | mol % | 0.0 | 6.4 | 8.6 | 21.7 | 33.8 | 42.8 |
|  | Total Comonomers Equivalents | ** | 0.0 | 12.8 | 17.2 | 43.4 | 67.6 | 45.6 |

\* Comparative Example A (Commercial GE PBT 315)
\*\* Residual Equivalents relative to the total of 100 equivalents of diol and 100 equivalents of diacid groups

EXAMPLES 16-17

These examples were generated primarily to understand the effect of presence of higher levels of diethylene glycol unit in the PET derived PBT. Examples were generated both at lab scale as well as the pilot plant scale to study impact of diethylene glycol residual on PBT properties. Different levels of DEG were added to the reaction mixture purposely to simulate the impact of high DEG unit residuals in PET derived PBT copolymer.

EXAMPLES 16 and 17

Pilot Plant Process (Different DEG:PET Molar Ratios)

One can vary the amount of EG in the final product by varying the starting amount of DEG. A procedure similar to that described in Example 2 was followed for Examples 16 and 17 with DEG being added along with the PET and BDO. Two different DEG to PET molar ratios (3.14:1 and 3.19:1) were used for this reaction. The weights of the starting monomers used for examples 11-15 are listed in Table 8. The resulting properties of the PBT synthesized by these reactions are shown in Table 9.

TABLE 8

Raw material amount details used for the Examples 16-17 (PET derived PBT)

| Item | Parameter | Unit | 16 | 17 |
|---|---|---|---|---|
| Raws | Polyester Type |  | Recycled PET | Recycled PET |
|  | Diol:PET Mole Ratio |  | 3.14:1 | 3.19:1 |
|  | PET Weight | kg | 11.4 | 11.4 |
|  | BDO Weight | kg | 16.8 | 16.8 |
|  | DEG Weight | kg | .31 | .63 |
|  | TPT as Ti element | ppm | 56 | 56.5 |

TABLE 9

Differential scanning calorimetry (DSC) and composition data
by NMR of the Examples 16-17 and Comparative Example A

| Item | Parameter | Unit | A * | Ex. 16 | Ex. 17 |
|---|---|---|---|---|---|
| DSC Data | Melting Point | ° C. | 222.6 | 216.3 | 218.1 |
|  | Crystallization Temp | ° C. | 168.3 | 150.1 | 159.4 |
|  | DH fusion | ° C. | 38.4 | 27.1 | 26.5 |
|  | DH crystallization | kJ/kg | 39.9 | 39.9 | 37.7 |
| Intrinsic Viscosity | Iv | dL/g | 1.2 | 1.1 | 1.1 |
| Composition by | EG Repeat Unit | mol % | 0.0 | 3.0 | 3.2 |
| NMR analysis | DEG Repeat Unit | mol % | 0.0 | .4 | .3 |
| based on total | BDO Repeat Unit | mol % | 50.0 | 47.4 | 47.3 |
| diol and diacid | Isophthalic Repeat Unit | mol % | 0.0 | 1.0 | 1.0 |
| units) | Terephthalic Repeat Unit | mol % | 50.0 | 48.1 | 48.1 |
|  | Total Comonomers | mol % | 0.0 | 4.4 | 4.5 |
|  | Total Comonomer Equivalents | ** | 0.0 | 8.8 | 9.0 |

\* Comparative Example A (Commercial GE PBT 315)
\*\* Residual Equivalents relative to the total of 100 equivalents of diol and 100 equivalents of diacid groups Data Analysis:

In Examples 1-17, the total number of diol moieties was set to 50 mole % and total number of diacid moieties was set to 50 mole %. To generate a comprehensive understanding of total residual impact on PBT properties, all the data from Examples 1-17 were arranged in order of increasing total comonomer residual content. It should also be noted for purposes of this analysis, the diol as well as the diacid comonomers were expressed as percent (%) of diol and diacid present, respectively. The total comonomer loadings reported in the polymer in Tables 10(a), 10(b), 10(c) will be twice that reported in Examples 1-17.

TABLE 10(a)

| Item | Parameter | Unit | A* | Ex. 4 | Ex. 2 | Ex. 1 | Ex. 16 | Ex. 17 |
|---|---|---|---|---|---|---|---|---|
| DSC Data | Melting Point | °C. | 222.6 | 218.2 | 213.4 | 213.6 | 216.3 | 218.1 |
| | Crystallization Temp | °C. | 168.3 | 176.8 | 168.5 | 167.9 | 150.1 | 159.4 |
| | DH fusion | °C. | 38.4 | 37.7 | 29.4 | 35.8 | 27.1 | 26.5 |
| | DH crystallization | kJ/kg | 39.9 | 38.9 | 37.0 | 37.4 | 39.9 | 37.7 |
| Intrinsic Viscosity | Iv | dL/g | 1.2 | 1.0 | — | 1.0 | 1.1 | 1.1 |
| Composition by | EG Repeat Unit | mol % | 0 | 2.2 | 2.4 | 4.6 | 6.0 | 6.4 |
| NMR analysis | DEG Repeat Unit | mol % | 0 | 0.8 | 1.2 | 0.6 | .8 | .6 |
| based on 100 | BDO Repeat Unit | mol % | 100 | 96.4 | 96.4 | 94.0 | 94.8 | 94.6 |
| moles of diol | Isophthalic Repeat Unit | mol % | 0 | 0.0 | 2.2 | 2.4 | 2.0 | 2.0 |
| and 100 moles of diacid respectively) | Terephthalic Repeat Unit | mol % | 100 | 100.3 | 98.0 | 98.2 | 96.2 | 96.2 |
| | Total Comonomer Equivalents | ** | | 0.0 | 3.0 | 5.8 | 7.6 | 8.8 | 9.0 |

* Comparative Example A (Commercial GE PBT 315)
** Residual Equivalents relative to the total of 100 equivalents of diol and 100 equivalents of diacid groups TABLE 10(b)

Impact of total comonomer content on PBT properties.

| Item | Parameter | Unit | A* | Ex. 5 | Ex. 11 | Ex. 3 | Ex. 12 | Ex. 6 | Ex. 7 |
|---|---|---|---|---|---|---|---|---|---|
| DSC Data | Melting Point | °C. | 222.6 | 210.5 | 210.9 | 204.5 | 203.1 | 201.0 | 199.6 |
| | Crystallization Temp | °C. | 168.3 | 167.3 | 149.9 | 158.8 | 139.7 | 164.0 | 132.6 |
| | DH fusion | °C. | 38.4 | 32.9 | 24.8 | 27.1 | 23.7 | 29.0 | 23.6 |
| | DH crystallization | kJ/kg | 39.9 | 35.6 | 38.7 | 33.4 | 33.4 | 33.3 | 35.2 |
| Intrinsic Viscosity | Iv | dL/g | 1.2 | 1.1 | 1.1 | 1.1 | 1.2 | 1.1 | 1.0 |
| Composition by | EG Repeat Unit | mol % | 0 | 9.2 | 5.6 | 10.6 | 5.8 | 19.0 | 20.8 |
| NMR analysis | DEG Repeat Unit | mol % | 0 | 0.8 | .4 | 1.0 | .4 | 0.8 | .4 |
| based on 100 | BDO Repeat Unit | mol % | 100 | 89.2 | 95.0 | 88.4 | 94.8 | 79.4 | 79.8 |
| moles of diol and 100 moles | Isophthalic Repeat Unit | mol % | 0 | 0.0 | 6.8 | 2.4 | 11.0 | 0.0 | 2.0 |
| of diacid respectively) | Terephthalic Repeat Unit | mol % | 100 | 100.8 | 92.4 | 97.8 | 88.2 | 100.8 | 97.0 |
| | Total Comonomer Equivalents | ** | 0 | 10.0 | 12.8 | 14.0 | 17.2 | 19.8 | 23.2 |

* Comparative Example A (Commercial GE PBT 315)
** Residual Equivalents relative to the total of 100 equivalents of diol and 100 equivalents of diacid groups TABLE 10(c)

| Item | Parameter | Unit | A* | Ex. 13 | Ex. 8 | Ex. 9 | Ex. 10 | Ex. 14 | Ex. 15 |
|---|---|---|---|---|---|---|---|---|---|
| DSC Data | Melting Point | °C. | 222.6 | 143.6 | 176.9 | 174.4 | 180.0 | 0 | 0 |
| | Crystallization Temp | °C. | 168.3 | 75.8 | 136.5 | 98.5 | 99.3 | 0 | 0 |
| | DH fusion | °C. | 38.4 | 12.9 | 15.5 | 21.3 | 23.4 | 0 | 0 |
| | DH crystallization | kJ/kg | 39.9 | 19.6 | 9.5 | 21.5 | 22.0 | 0 | 0 |
| Intrinsic Viscosity | Iv | dL/g | 1.2 | 1.1 | 0.7 | 0.87 | .71 | 0.67 | .96 |
| Composition by | EG Repeat Unit | mol % | 0 | 2.0 | 50.4 | 54.2 | 62.8 | .6 | 2.2 |
| NMR analysis | DEG Repeat Unit | mol % | 0 | 0 | 0 | 0 | 0 | 0 | 0 |
| based on 100 | BDO Repeat Unit | mol % | 100 | 97.8 | 50.8 | 45.8 | 38.6 | 100.8 | 97.8 |
| moles of diol and 100 moles | Isophthalic Repeat Unit | mol % | 0 | 41.4 | 2.2 | 2.6 | 1.6 | 67.0 | 83.4 |
| of diacid respectively) | Terephthalic Repeat Unit | mol % | 100 | 58.8 | 96.6 | 97.6 | 97.0 | 31.6 | 16.6 |
| | Total Comonomer Equivalents | ** | 0 | 43.4 | 52.6 | 56.8 | 64.4 | 67.6 | 58.6 |

* Comparative Example A (Commercial GE PBT 315)
** Residual Equivalents relative to the total of 100 equivalents of diol and 100 equivalents of diacid groups Discussion PBT copolymers have limited practical utility as a high temperature, fast cycling, crystalline polyester when their melting point decreases below 200° C. From the above examples(this and the next paragraph are in the wrong place for purposes of this discussion as none of the examples are expressed this way), it is seen that the melting point reaches 200° C. at total comonomer loadings at approximately 23 equivalents, relative to the total of 100 equivalents of diol and 100 equivalents of diacid groups in the modified polybutylene terephthalate random copolymer. Thus, all examples with comonomer loadings less than or equal to approximately 23 equivalents in the above table would be considered to be polymers of particularly useful PBT properties.

This data illustrates that PET recycle can be converted in the process described here to yield surprising useful PBT copolymer resins. Certain PET recycle sources will contain low volatility residuals such as IPA and/or DEG. By maintaining these residuals in combination with the residual EG that is controlled by process conditions to less than approximately 23 equivalents, relative to the total of 100 equivalents of diol and 100 equivalents of diacid groups in the modified polybutylene terephthalate random copolymer, a surprisingly useful PBT copolymer can be achieved.

EXAMPLE 18

A procedure similar to Example 2 was followed for Example 18. This time recycle PET flakes from Evergreen Inc. were used for the synthesis. The weights of the starting monomers used for example 18 are listed in Table 11. The purpose of this experiment was to show that the PBT copolymer made by this process tends to have higher levels of metal residues derived from the starting PET component. These inorganic residues derived from the PET component can be seen in Table 12. Despite the high levels, our modified polybutylene terephthalate random copolymer exhibits properties that are similar to monomer-based, "virgin" PBT which can be seen in Table 13.

TABLE 11

Raw material amount details used for the Example 18 (PET derived PBT)

| Item | Parameter | Unit | 18 |
|---|---|---|---|
| Raws | Polyester Type | | Recycled PET |
| | BDO:PET Mole Ratio | | 2.9:1 |
| | PET Weight | kg | 11.4 |
| | BDO Weight | kg | 15.9 |
| | TPT as Ti element | ppm | 59 |

TABLE 12

Inorganic PET Residues and Total Metal Ion Content for Example 18 and Comparative Example A

| Inorganic residues derived from the PET | Units | A* | Example 18 |
|---|---|---|---|
| Chlorines | ppm | 0 | 0 |
| Sulfates | ppm | 0 | 47.0 |
| Bromides | ppm | 0 | 45.0 |
| Phosphates | ppm | 0 | 24.5 |
| Aluminum | ppm | 1.1 | 4.7 |
| Calcium | ppm | 7.1 | 26.3 |
| Chromium | ppm | 0 | 0.4 |
| Copper | ppm | 0 | 6.7 |
| Iron | ppm | 0.2 | 42.7 |
| Magnesium | ppm | 0 | 2.2 |
| Sodium | ppm | 0.2 | 6.7 |
| Nickel | ppm | 0 | 0.4 |
| Silicon | ppm | 14.5 | 58.4 |
| Titanium | ppm | 113.0 | 57.2 |
| Zinc | ppm | 0.8 | 21.9 |
| Potassium | ppm | 0 | 4.1 |
| Antimony | ppm | 0 | 174.0 |
| Cobalt | ppm | 0 | 24.6 |
| Total Metal Ions Only | ppm | 122.4 | 475.8 |

*Comparative Example A (Commercial GE PBT 315)

TABLE 13

Differential scanning calorimetry (DSC), Intrinsic viscosity (IV) and composition data by NMR of the Example 18 and Comparative Example A

| Item | Parameter | Unit | A* | Example 18 |
|---|---|---|---|---|
| DSC Data | Melting Point | °C. | 222.6 | 217.7 |
| | Crystallization Temp | °C. | 168.3 | 163.1 |
| | DH fusion | °C. | 38.4 | 26.4 |
| | DH crystallization | kJ/kg | 39.9 | 41.1 |
| Intrinsic Viscosity | Iv | dL/g | 1.2 | 0.98 |
| Composition by NMR analysis based on total moles of diol and diacid groups) | EG Repeat Unit | mol % | 0 | 1.3 |
| | DEG Repeat Unit | mol % | 0 | 0.2 |
| | BDO Repeat Unit | mol % | 50 | 48.5 |
| | Isophthalic Repeat Unit | mol % | 0 | 1.1 |
| | Terephthalic Repeat Unit | mol % | 50 | 48.9 |

*Comparative Example A (Commercial GE PBT 315)

EXAMPLE 19

Synthesis of Butanediol from Corn Based Succinic Acid

The purpose of this example is to show that BDO can be derived from biomass. Bio-succinic acid for the experiments performed in example 19 was sourced from Diversified Natural Products. BDO from bio Succinic acid was synthesized in a two-step process as below:

Step (1): Esterification of Succinic Acid to Diethyl Ester:

In a 2.0 liter RB flask on an oil bath with overhead stirrer and condenser arrangement, 200 grams (1.69 moles) of bio succinic acid, 1.0 liter of dry ethyl alcohol and 5-8drops of conc. $H_2SO_4$ were charged and heated to reflux for 8 hrs. After 8 hrs the alcohol was distilled off, 500 mL dichloromethane was added, and washed with 450 mL of 10% sodium carbonate solution to get distinctly alkaline pH. The organic layer was washed with water and then dried over anhydrous sodium sulfate. The solvent was removed and the diester product was distilled off under vacuum. The pure diester was collected at 140-145° C. at ~20 mm Hg pressure.

Wt of diester: 285 grams
Purity: >99.0% (GC)
Yield: 95%

Step (2): Reduction of Diester to BDO:

60 grams (2.6 moles) of clean sodium was placed in a 3 liter RB flask fitted with condenser, overhead stirrer, thermo well and an addition funnel A mild nitrogen flow was maintained to the flask to keep an inert atmosphere. The nitrogen blanket was removed and a solution of 35 grams (0.2 moles) of diethyl succinate in 700 mL dry ethyl alcohol was added from the dropping funnel, as rapidly as possible keeping the reaction under control. If necessary, external cooling may be applied to keep the reaction under control. The reaction mass was then heated to 120-130° C. for 90 minutes till all the sodium dissolved. Then the reaction mass was cooled to room temp and 25 mL of water was cautiously added. The reaction mixture was refluxed for another 30 minutes to get the unreacted ester hydrolyzed (if any) and then 270 mL conc. hydrochloric acid was added to the cold mixture. The precipitated sodium chloride was filtered off and the filtrate was treated with 300 grams anhydrous potassium carbonate to free it from water. The alcoholic solution was filtered off and the solids were washed with hot alcohol (2×100 mL), the alcohol was removed by distillation. Dry acetone (200-250 mL) was added to the residue, the solids were filtered off and then the acetone was distilled to get the crude BDO. The crude BDO was further distilled under vacuum to get pure fraction at 135-138° C. (20 mm Hg pressure). The weight of BDO obtained in this experiment was 8 grams and the yield was measured to be 45% on the basis of the amount of ester charged.

The biomass derived BDO in this Example can be used in lieu of the BDO used in the process of Example 1.

EXAMPLE 20

Synthesis of PBT from Recycle PET and BDO from Bio Based Succinic Acid

The purpose of this example is to show that PBT copolymers can be made from biomass-derived BDO.

PET (recycle) 3.5 g (18.23 mmol), ethylene glycol 1.69 g (27.26 mmol) were added to a reactor, and heated to 180° C. under nitrogen atmosphere. At 180° C., the catalyst tetraisopropyl orthotitanate (TPT) 200 ppm was added and heating was continued to 225-230° C. and kept for 90 minutes. 5.6 g (62.22 mmol) of 1,4-butane diol (BDO) derived from bio Succinic acid was added to the reaction mass and continued the reaction for another 15 minutes with distilling off ethylene glycol and butane diol from the reaction. Vacuum was applied in a stepwise manner starting from 700 mbar to 500, 300, 100, 75, 50, 25, 10, 5.5, 1.5 and finally to less than 1.0 mbar. The molten reaction mass kept at 0.7 to 0.5 mbar for 30 minutes and finally the polymer was drained off the reactor under nitrogen pressure.

The polyester we obtained had an IV of 0.7 dL/g, melting temperature (Tm) 215° C. The polyester had a weight average molecular weight of 57517 and a number average molecular weight of 13969 (Mw/Mn=4.12). The $^1$H NMR of the polyester showed 96.4 mol % butane diol incorporation and 3.6 mol % of residual ethylene glycol incorporation.

In all the examples above where PBT was derived from PET, the process for making the modified polybutylene terephthalate random copolymers exhibited a reduced $CO_2$ emissions index that was more than one, (1) (more than 1 kg of $CO_2$ was reduced for every kg of modified PBT copolymer that was made). The example of PBT made from PET and bio-based BDO illustrates that the $CO_2$ impact can be further reduced by using monomer derived from biomass. Although the present invention has been described in detail with reference to certain preferred versions thereof, other variations are possible. Therefore, the spirit and scope of the appended claims should not be limited to the description of the versions contained therein.

What is claimed is:

1. A composition comprising a modified polybutylene terephthalate random copolymer that (1) is derived from a polyethylene terephthalate component selected from the group consisting of polyethylene terephthalate and polyethylene terephthalate copolymers and (2) comprises at least one residue derived from the polyethylene terephthalate component, wherein the modified polybutylene terephthalate random copolymer (i) has an intrinsic viscosity that is more than 0.55 dL/g and a melting temperature that is more than 200° C., and (ii) the at least one residue derived from the polyethylene terephthalate component includes from 0.1 to 10 moles % ethylene glycol groups and from 0.1 to 10 mole % diethylene glycol groups, based on the total moles of diol groups in the copolymer, as part of a mixture of ethylene glycol groups, diethylene glycol groups and isophthalic acid groups at an amount ranging from more than 0 to 23 equivalents, relative to the total of 100 equivalents of diol and 100 equivalents of diacid groups in the modified polybutylene terephthalate random copolymer, and from more than 0 ppm to less than 1000 ppm of an inorganic residue selected from the group consisting of antimony-containing compounds, germanium-containing compounds, titanium-containing compounds, cobalt-containing compounds, tin containing compounds, aluminum, aluminum salts, alkali salts, alkaline earth metal salts, phosphorous-containing compounds, phosphorous-containing anions, sulfur-containing compounds, sulfur-containing anions, and combinations thereof.

2. The composition of claim 1, wherein the mixture of ethylene glycol groups, diethylene glycol groups and isophthalic acid groups ranges from 3 to 23 equivalents, relative to the total of 100 equivalents of diol and 100 equivalents of diacid groups in the modified polybutylene terephthalate random copolymer.

3. The composition of claim 1, wherein the mixture of ethylene glycol groups, diethylene glycol groups and isophthalic acid groups ranges from 3 to 10 equivalents, relative to the total of 100 equivalents of diol and 100 equivalents of diacid groups in the modified polybutylene terephthalate random copolymer.

4. The composition of claim 1, wherein the mixture of ethylene glycol groups, diethylene glycol groups and isophthalic acid groups ranges from 10 to 23 equivalents, relative to the total of 100 equivalents of diol and 100 equivalents of diacid groups in the modified polybutylene terephthalate random copolymer.

5. The composition of claim 1, wherein the amount of ethylene glycol groups in the modified polybutylene terephthalate random copolymer is greater than 0.85 wt. %, based on the weight of the modified polybutylene terephthalate random copolymer.

6. The composition of claim 1, wherein the amount of isophthalic acid groups ranges from 0.1 to 10 mole %, based on the total moles of diacid groups in the modified polybutylene terephthalate random copolymer.

7. The composition of claim 1, wherein the inorganic residue is present in an amount ranging from 250 to 1000 ppm.

8. The composition of claim 1, wherein the at least one residue derived from the polyethylene terephthalate component further comprises at least one residue selected from the group consisting of 1,3-cyclohexane dimethanol isomers, 1,4-cyclohexane dimethanol isomers, naphthalene dicarboxylic acids, 1,3-propane diol groups, and combinations thereof.

9. The composition of claim 8, wherein cyclohexane dimethanol groups are present in the modified polybutylene terephthalate random copolymer in an amount ranging from 0.1 to 10 mole %, based on the total moles of diol.

10. The composition of claim 9, wherein the total amount of ethylene glycol, diethylene glycol, cyclohexane dimethanol, and isophthalic acid groups from the at least one polyethylene terephthalate component, is 0.5 to 4 wt %, based on the weight of the modified polybutylene terephthalate random copolymer.

11. The composition of claim 1, wherein the modified polybutylene terephthalate random copolymer has a melting temperature of 200 to 223° C.

12. The composition of claim 1, wherein the modified polybutylene terephthalate random copolymer has a melting temperature of 211 to 223° C.

13. The composition of claim 1, wherein the modified polybutylene terephthalate random copolymer is not subjected to solid-state polymerization and the intrinsic viscosity of the copolymer is 0.55 to 1.3 dL/g.

14. The composition of claim 1, wherein the modified polybutylene terephthalate random copolymer has an intrinsic viscosity of 1.5 dL/g or higher.

15. The composition of claim 1, wherein the modified random polybutylene terephthalate copolymer has a crystallization temperature of from 120 to 190° C. and a heat of crystallization of at least 10 J/g as measured by differential scanning calorimetry using ASTM method D3418 with a cooling rate of 20° C/minute.

16. The composition of claim 1, wherein the modified random polybutylene terephthalate copolymer has at least one of a flexural modulus of at least 1000 MPa, a tensile strength at yield of at least 30 MPa, a tensile elongation at yield of at least 2%, a notched Izod strength of at least 20 J/m, and a heat deflection temperature of at least 45° C. at 1.82 MPa for 3.2 mm bars.

17. The composition of claim 1, wherein the modified polybutylene terephthalate random copolymer has a $CO_2$ reduction index that is more than 1 kg.

18. A composition comprising a modified polybutylene terephthalate random copolymer that (1) is derived from a polyethylene terephthalate component selected from the group consisting of polyethylene terephthalate and polyethylene terephthalate copolymers and (2) at least one residue derived from the polyethylene terephthalate component,
wherein the modified polybutylene terephthalate random copolymer (i) has an intrinsic viscosity that is more than 0.55 dL/g and a melting temperature that is more than 200° C., and (ii) the at least one residue derived from the polyethylene terephthalate component includes from 0.1 to 10 moles % ethylene glycol groups and from 0.1 to 10 mole % diethylene glycol groups, based on the total moles of diol groups in the copolymer, as part of a mixture of ethylene glycol groups, diethylene glycol groups and isophthalic acid groups at an amount ranging from more than 0 to 23 equivalents, relative to the total of 100 equivalents of diol and 100 equivalents of diacid groups in the modified polybutylene terephthalate random copolymer, and from more than 0 ppm to less than 1000 ppm of an inorganic residue selected from the group consisting of antimony-containing compounds, germanium-containing compounds, titanium-containing compounds, cobalt-containing compounds, tin-containing compounds, aluminum, aluminum salts, alkali salts, alkaline earth metal salts, phosphorous-containing compounds, phosphorous-containing anions, sulfur-containing compounds, sulfur-containing anions, and combinations thereof,
wherein the modified polybutylene terephthalate is made from a process comprising
(a) depolymerizing a polyethylene terephthalate component with a 1,4-butane diol component at a temperature ranging from 180° C. to 230° C., under agitation, at a pressure that is at least atmospheric pressure in the presence of a catalyst component, under an inert atmosphere, to produce a molten mixture containing a component selected from the group consisting of ethylene terephthalate oligomers, oligomers containing butylene terephthalate moieties, ethylene isophthalate oligomers, oligomers containing butylene isophthalate moieties, oligomers containing diethylene terephthalate moieties, oligomers containing diethylene glycol isophthalate moieties, oligomers containing butylene, ethylene and diethylene terephthalate moieties, oligomers containing butylene, ethylene and diethylene isophthalate moieties, oligomers containing all butylene, ethylene and diethylene isophthalates and terephthalates, 1,4-butane diol, ethylene glycol, and combinations thereof; and
(b) agitating the molten mixture at subatmospheric pressure and increasing the temperature of the molten mixture to an elevated temperature under conditions sufficient to form the modified polybutylene terephthalate random copolymer,
wherein a basic compound selected from the group consisting of an alkali metal compound, an alkaline earth metal compound, an aluminum compound and a combination thereof is added to the reactor in step (a) in an amount sufficient to reduce the amount of tetrahydrofuran produced in the process.

19. The composition of claim 18, wherein the process further comprises increasing the molecular weight of the polymer obtained in step (b) by subjecting the polymer formed in step (b) to solid-state polymerization.

20. The composition of claim 18, wherein the 1,4-butane diol is derived from corn or from succinic acid, which is in turn derived from biomass by a fermentation process.

21. The composition of claim 18, wherein the polyethylene terephthalate component is further depolymerized with ethylene glycol.

22. The composition of claim 18, wherein the amount of basic compound sufficient to reduce the amount of tetrahydrofuran produced in the process is 0.1 to 50 ppm.

23. The composition of claim 18, wherein step (b) is conducted at a temperature ranging from 240° C. to 260° C. and wherein step (b) is carried out from 30 minutes to 5 hours.

24. The composition of claim 18, wherein 1,4-butane diol is refluxed back into the reactor during step (a), and wherein excess 1,4-butane diol, ethylene glycol, and tetrahydrofuran are removed during step (b).

25. The composition of claim 18, wherein the molten mixture is placed under subatmospheric conditions without isolation and dissolution of any material from the molten mixture.

26. The composition of claim 18, wherein 1,4-butane diol and ethylene glycol are refluxed back into the reactor, and tetrahydrofuran is distilled during step (a) of the process.

27. The composition of claim 18, wherein step (a) is carried out from 30 minutes to 5 hours and step (b) is carried out from 30 minutes to 5 hours.

28. The composition of claim 18, wherein the 1,4-butane diol is used in step (a) in a molar excess amount, relatively to the PET component, and wherein the molar excess of the 1,4-butane diol ranges from 2 to 20.

29. The composition of claim 18, wherein the catalyst component is selected from the group consisting of antimony-containing compounds, tin-containing compounds, germanium-containing compounds, titanium-containing compounds, and combinations thereof, and is used in an amount ranging from 10 to 5000 ppm.

30. The composition of claim 18, wherein in step (b) the pressure is reduced to less than 1 Torr.

* * * * *